United States Patent [19]
Nudelman et al.

[11] 3,894,013
[45] July 8, 1975

[54] SULFIN AND SULFONAMIDINO DERIVATIVES OF CEPHALOSPORINS.

[75] Inventors: Abraham Nudelman, Montgomery; Ronald J. McCaully, Chester, both of Pa.

[73] Assignee: American Home Products Corporation, New York, N.Y.

[22] Filed: May 7, 1973

[21] Appl. No.: 357,761

[52] U.S. Cl. .......... 260/243 C; 424/246; 260/239.1; 424/271

[51] Int. Cl.² ....................... C07D 501/16
[58] Field of Search ................ 260/243 C

[56] References Cited
UNITED STATES PATENTS

| | | | |
|---|---|---|---|
| 3,660,379 | 5/1972 | Murimoto et al. | 260/239.1 |
| 3,748,323 | 7/1973 | Hamanakai | 260/239.1 |

*Primary Examiner*—Nicholas S. Rizzo
*Attorney, Agent, or Firm*—Stephen Venetianer

[57] ABSTRACT

This disclosure is directed to derivatives of 6-amino penicillanic and 7-amino cephalosporanic acids having the following structural formulas:

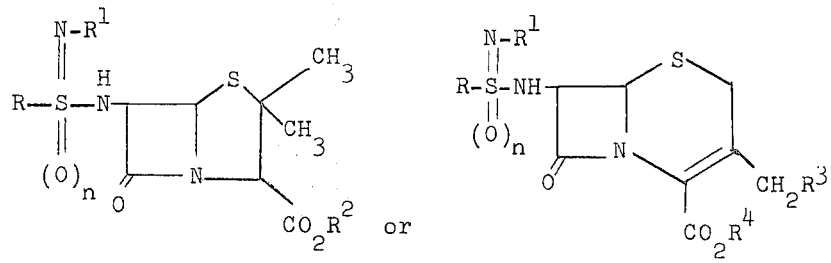

wherein R, $R^1$–$R^4$ and $n$ are defined herein.

5 Claims, No Drawings

SULFIN AND SULFONAMIDINO DERIVATIVES OF CEPHALOSPORINS.

FIELD OF THE INVENTION

This invention relates to derivatives of 6-amino penicillanic (6-APA) and 7-amino cephalosporanic acids (7-ACA). More particularly, this invention relates to sulfinamidino and sulfonamidino derivatives of 6-APA and 7-ACA.

SUMMARY OF THE INVENTION

This invention relates to the following novel derivatives of 6-APA and 7-ACA represented by the following structural formulas:

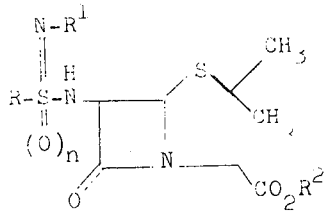

I

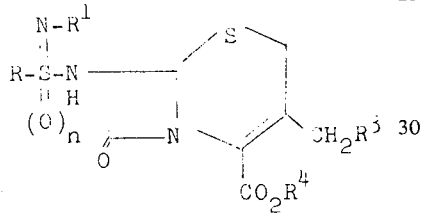

II wherein R is (lower)alkyl, (lower)alkylaryl, aryl, ar(-lower) alkyl, aryloxy(lower)alkyl;

$R^1$ is (lower)alkyl, aryl or aryl sulfonyl;

$R^2$ is hydrogen or a pharmaceutically acceptable cation;

$R^3$ is hydrogen, hydroxyl, (lower)alkanoyloxy; benzoyloxy, a quaternary ammonium radical;

$R^4$ is hydrogen or a pharmaceutically acceptable cation.

It is to be noted that structure II possesses a carboxylate moiety when $R^3$ is a quaternary ammonium radical. Additionally $R^3$ and $R^4$ taken together may be a covalent bond group in order to form a five membered lactone ring and $n$ is zero or one.

DESCRIPTION OF THE INVENTION

As used herein the term (lower)alkyl means a straight or branch chain hydrocarbon radical having $C_1$–$C_6$ carbons. Illustrative of (lower)alkyl is methyl, ethyl, isopropyl, butyl, sec-butyl, hexyl, etc. The term (lower)alkylaryl is exemplified by tolyl and xylyl. The term "aryl" includes phenyl and naphthyl. The term "aryloxy" includes phenoxy and naphthoxy. The term ar(lower)alkyl means monocyclic and bicyclic carbocyclic lower alkyl radicals exemplified by benzyl, β-phenylethyl, α-phenylpropyl, α-phenylethyl and α-naphthylethyl.

The preferred compounds of the present invention have the following structural formula:

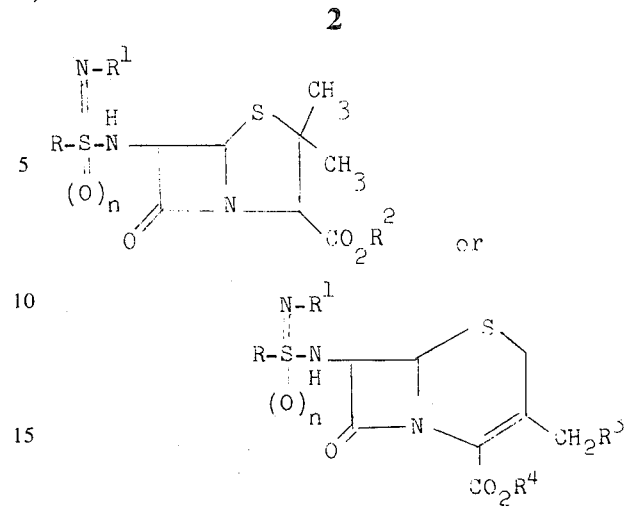

wherein R is phenyl, benzyl or tolyl, $R^1$ is phenyl, methyl or ethyl or p-tolylsulfonyl, $R^2$ is hydrogen or trialkylammonium cation, $R^3$ is hydrogen or (lower)alkanoyloxy and $R^4$ is hydrogen or trialkylammonium cation.

The compounds of this present invention can be prepared in the following manner:

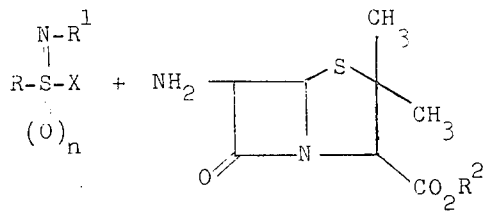

III           IV tertiary amine⟶ compound I

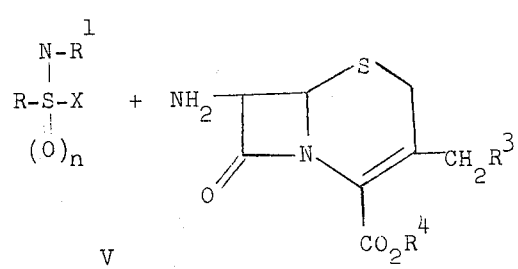

V tertiary amine ⟶ compound II wherein: X=chlorine or bromine

Compounds of Formula III wherein $n$ is 0 may be prepared by the following method established in the prior art.

E. S. Levchenko and L. V. Selezenko Z. Org. Khim (USSR), 2, 92 (1966)

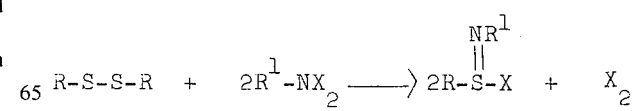

Compounds of Formula III wherein n is 0 or 1 may be prepared by the following method established in the prior art.

E. S. Levchenko, N. Ya Derkach and A. V. Kivsanov, Z. Obchei. Khim., 31 1971 (1961)

$$R-\overset{(O)_n}{\underset{\|}{S}}-X + R^1-N\overset{X}{\underset{Na}{\diagup\diagdown}} \longrightarrow R-\overset{N-R^1}{\underset{\underset{(O)_n}{\|}}{S}}-X + NaX$$

Compounds of Formula III wherein $n$ is 1 may be prepared by the following method established in the prior art.

E. V. Jonnson, C. C. Bacon and C. R. Johnson, J. Am. Chem. Soc., 93, 5306 (1971)

$$R-\overset{(O)_n}{\underset{\|}{S}}-NH-R^1 + X_2 \longrightarrow R-\overset{N-R^1}{\underset{\underset{(O)_n}{\|}}{S}}-X + HX$$

As will be understood by those skilled in the art, the compounds of Formula I and II may be utilized in their acid form or in the form of their therapeutically active salts thereof, e.g., the sodium or potassium salts, or in the form of the pharmaceutically acceptable salts prepared by the reaction of the penicillin or cephalosporin compounds with an amine, a trialkylamine, or diamine base, e.g., triethylamine, procaine or various N-N'-disubstituted alkylene diamines, such as N,N'-dibenzyl-ethylene-diamine, etc. Additionally, the compounds of Formula I and II may be utilized in their hydrated form.

The new compounds of the series defined above show desirable broad spectrum anti-bacterial activity and are useful as therapeutic agents for poultry and mammals in the treatment of infectious diseases caused by gram-positive and gram-negative bacteria by either parenteral or oral administration, particularly strains of *Bacillus subtilis*, *Staphylococcus aureus*, *Salmonella paratyphi*, and *Klebsiella pneumoniae*.

As will also be understood by those skilled in the art, the compounds of the invention may be utilized in suitable dosage forms, including solutions, suspensions, tablets, capsules, and the like.

The following examples are illustrative of the invention.

EXAMPLE 1

5-Chloro-5-p-tolyl-N-p-tolysulfonylsulfilimine

This compound was obtained in 90 percent yield following the procedure of Levchenko and co-workers referred to previously. When recrystallized from dichloromethane it showed a melting point of 141.5°–142.5°, nmr (DCCl$_3$) ppm ( $\delta$ ) 2.53 (s, 6), 7.3 (m, 4), 8 (m, 4).

Anal. Calcd for C$_{14}$H$_{14}$ClNO$_2$S$_2$: C, 51.30; H, 4.27.
Found: C, 51.21; H, 4.25.

EXAMPLE 2

6-[N'-(p-Tolylsulfonyl)-p-toluenesulfinamidino]-penicillanic acid triethylamine salt To an ice cold solution of 6-aminopenicillanic acid (2.16 g, 10$^{-2}$ mole) and triethylamine (2.5 g) in 35 ml of dichloromethane, a solution of 5-chloro-5-p-tolyl-N-p-tolylsulfonylsulfilimine obtained in Example 1 (3.3 g, 10$^{-2}$ mole) in 25 ml of dichloromethane is added. The solution is stirred at ice temperature for 1 hour and at room temperature for an additional hour. The solution is then washed with ice-cold water, dried and flash evaporated at 35°. The residual oil is mixed with ether to give 6-[N'-(p-tolylsulfonyl)-p-toluenesulfinamidino] penicillanic acid triethylamine salt as a white solid, that decomposes above 150°, nmr (DMSO-D$_6$) ppm ( $\delta$ ) 1.2 (t, 9), 1.50 (s, 3), 1.57 (s, 3), 2.35 (s, 6), 3.07 (q, 6), 4.20 (s, 1), 5.02 (q,2,J$_{AB}$ = 3cps; $\Delta\delta$ = 0.1 ppm), 7.1–7.9 (m, 8).

Anal. Calcd for C$_{28}$H$_{40}$N$_4$O$_5$S$_3$: C, 55.23; H, 6.62; N, 9.20.
Found: C, 55.24; H, 6.68; N, 9.08.

EXAMPLE 3

7-[N'-(p-Tolylsulfonyl)-p-toluenesulfinamidino]cephalosporanic acid, triethylamine salt The above compound is prepared by the same procedure as that used in Example 2, where 7-aminocephalosporanic acid is substituted for the 6-aminopenicillanic acid. The product obtained decomposes when heated, nmr (DMSO-D$_6$) ppm ( $\delta$ ), 1.15 (t, 9), 2.02 (s, 3), 2.32 (s, 6), 3.1 (q, 6), 3.4–3.5 (m, 2), 4.5–5.1 (m, 4), 7.1–7.9 (m, 8).

Anal. Calcd for C$_{30}$H$_{40}$N$_4$O$_7$S$_3$: C, 54.19; H, 6.06; N, 8.43.
Found: C, 54.11; H, 6.14; N, 7.63.

EXAMPLE 4

6-(N'-Methylbenzenesulfonamidino)penicillanic acid

To a solution of N-methyl-benzenesulfonimidoyl chloride (10$^{-2}$ moles), in 50 ml of dichloromethane at −70°C, a solution of 6-aminopenicillanic acid (2.16 g, 10$^{-2}$ mole) and triethylamine (3.5 g) in 50 ml of dichloromethane at −70°C is added. The solution is allowed to reach room temperature slowly and then stirred for 1 hour and washed with water. The organic phase is dried and concentrated at 35° to a small volume, which is then added dropwise to vigorously stirred pentane. The solid precipitate is filtered and dried, to give the title compound as an amorphous solid, which decomposes when heated, nmr (DMSO-D$_6$) ppm ( $\delta$ ) 1.4, (s, 3), 1.55 (s, 3), 3.3 (s, 3), 4.2 (s, 1), 5.3–5.6 (m, 2), 7.6–8.1 (m, 5).

Anal. Calcd for C$_{15}$H$_{19}$N$_3$O$_4$S$_2$: C, 48.76; H, 5.18; N, 11.37; S, 17.32.
Found: C, 49.29; H, 5.44; N, 10.89; S, 16.84.

EXAMPLE 5

7-(N'-Phenyl-α-toluenesulfonimidamido)cephalosporanic acid, dihydrate

The above compound is prepared by the same procedure as that described in Example 4 from 7-aminocephalosporanic acid (1.35 g, 5 mmoles) and N-phenyl-benzylsulfonimidoyl chloride (1.35 g, 5 mmoles). The obtained product decomposes when heated, nmr (DCCl$_3$) ppm ( $\delta$ ), 2.05 (s, 3), 3.3–3.6 (m, 2), 4.5–5.2 (m, 6), 7–7.8 (m, 10).

Anal. Calcd for C$_{23}$H$_{23}$N$_3$O$_6$S$_2$·2H$_2$O: C, 51.38; H, 5.06; N, 7.82.
Found: C, 50.97; H, 4.45; N, 7.61.

EXAMPLE 6

7-(N'-Ethyl-α-toluenesulfonimidamido)cephalosporanic acid

The title compound was prepared by the same procedure as that described in Example 4 from 7-aminocephalosporanic acid (1.35 g, 5 mmoles) and N-ethylbenzylsulfonimidoyl chloride (1.09 g, 5 mmoles). The N-ethylbenzylsulfonylimidoyl chloride was prepared by Johnson's procedure [J. Am. Chem. Soc., 93, 5306 (1971)] from N-ethylbenzylsulfinamide and chlorine. The obtained product decomposed upon heating.

Anal. Calcd for $C_{19}H_{23}N_3O_6S_2$: C, 50.32; H, 5.11.
Found: C, 50.06; H, 5.50.

The compounds of formula I and II of this invention have been found to possess antibacterial activity. Antibacterial screening is carried out by an agar serial dilution technique. Distilled water is used as a vehicle. The stock solution is prepared at 10,000 μg./ml. of substance in the vehicle. Two-fold dilutions are made with sterile water. One ml. quantitites of each dilution are incorporated into 9 ml. seed agar in sterile petrie dishes. The hardened surface is inoculated with test organisms and incubated 18 hours at 35°C. The end point is reported as a minimal inhibitory concentration (MIC) expressed in μg./ml.; the least amount of test substance that will completely inhibit the test organism. The compound of Example 6 when tested against Staphylococcus aureus 6538P and Staphylococcus aureus Smith produced a MIC value in each case of 1.94 μg./ml. and when tested against *Bacillus subtillus* produced a MIC value of 0.244 μg./ml.

What is claimed is:

1. A compound selected from the group consisting of:

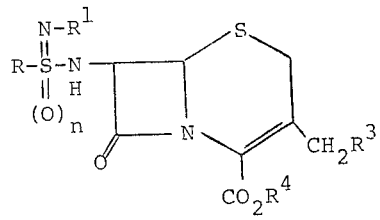

wherein R is selected from the group consisting of (lower)alkyl, tolyl, xylyl, phenyl, naphthyl, benzyl, β-phenylethyl, α-phenylpropyl, α-phenylethyl, α-naphthylethyl, and phenoxy(lower)alkyl and naphthoxy(lower)alkyl; $R^1$ is selected from the group consisting of (lower)alkyl, phenyl, naphthyl, phenyl sulfonyl and naphthyl sulfonyl; $R^3$ is selected from the group consisting of hydrogen, hydroxyl, (lower)alkanoyloxy; benzoyloxy,; $R^4$ is selected from the group consisting of hydrogen or a pharmaceutically acceptable cation and $n$ is 1 or 0.

2. A compound according to claim 1 wherein the compound is 7-[N'-(p-Tolysulfonyl)-p-toluenesulfinamidino] cephalosporanic acid, triethylamine salt.

3. A compound according to claim 1 wherein the compound is 7-(N'-Phenyl-α-toluenesulfonimidamido)cephalosporanic acid, dihydrate.

4. A compound according to claim 1 wherein the compound is 7-(N'-Ethyl-α-toluenesulfonimidamido)cephalosporanic acid.

5. A compound according to claim 1 wherein R is selected from the group consisting of phenyl, benzyl and tolyl, $R^1$ is selected from the group consisting of phenyl, methyl, ethyl and p-tolylsulfonyl, $R^3$ is hydrogen or loweralkanoyloxy and $R^4$ is hydrogen or trialkylammonium cation.

* * * * *